(12) United States Patent
Lee et al.

(10) Patent No.: US 6,721,008 B2
(45) Date of Patent: Apr. 13, 2004

(54) INTEGRATED CMOS ACTIVE PIXEL DIGITAL CAMERA

(75) Inventors: Paul P. Lee, Pittsford, NY (US); Lawrence J. Bernstein, Honeoye Falls, NY (US); Robert M. Guidash, Rush, NY (US); Teh-Hsuang Lee, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 18 days.

(21) Appl. No.: 09/010,698

(22) Filed: Jan. 22, 1998

(65) Prior Publication Data

US 2002/0101528 A1 Aug. 1, 2002

(51) Int. Cl.[7] .................................................. H04N 3/14
(52) U.S. Cl. ....................................................... 348/302
(58) Field of Search ................................ 348/294, 296, 348/300, 301, 302, 303, 304, 305, 306, 307, 308, 309, 310; 250/208.1

(56) References Cited

U.S. PATENT DOCUMENTS

| | | | | |
|---|---|---|---|---|
| 5,233,428 A | * | 8/1993 | Alford et al. ................ | 348/230 |
| 5,541,654 A | * | 7/1996 | Roberts ....................... | 348/301 |
| 5,841,126 A | * | 11/1998 | Fossum et al. ........... | 250/208.1 |
| 5,949,483 A | * | 9/1999 | Fossum et al. ............. | 348/303 |
| 5,990,469 A | * | 11/1999 | Bechtel et al. ........... | 250/208.1 |
| 6,155,488 A | * | 12/2000 | Olmstead et al. ........... | 235/440 |
| 6,166,768 A | * | 12/2000 | Fossum et al. ............. | 348/308 |

OTHER PUBLICATIONS

Ackland et al., "Camera on a Chip", Feb. 8, 1996, ISSCC96.*
Hust e.*

"256×256 CMOS Active Pixel Sensor Camera–on–a–Chip" by R.H. Nixon, S.E. Kemeny, C.O. Staller, E.R. Fossum. 1996 IEEE International Solid–State Circuits Conference, Session 11, Electronic Imaging Circuits, Paper FA 11.1.

"An Addressable 256×256 Photodiode Image Sensor Array with an 8–Bit Digital Output" by Christer Jansson and Per Ingelhag. Kluwer Academic Publishers, Boston, 1993.

Eric R. Fossum: "Digital Camera System on a Chip" IEEE Micro, US, IEEE Inc. New York, vol. 18, No. 3, May 1, 1998, pp. 8–15.

Junichi Nakamura, et al.: "On–Focal–Plane Signal Processing for Current–Mode Active Pixel Sensors" IEEE Transactions on Electron Devices, US, IEEE Inc. New York, vol. 44, No. 10, Oct. 1, 1997, pp. 1747–1758.

* cited by examiner

Primary Examiner—Wendy R. Garber
Assistant Examiner—Rashawn N. Tillery
(74) Attorney, Agent, or Firm—Peyton C. Watkins

(57) ABSTRACT

An image sensor device comprising a silicon substrate having a plurality of CMOS circuit formed thereon, including a pixel array having a plurality of rows and a plurality of columns, a row addressing circuit operatively connected to each the pixel array and the timing control circuit, the row addressing circuit having a row bus that provides address lines to each row in the pixel array, a column addressing circuit, a pixel timing circuit, a timing control logic block, a signal processing circuit, and an interface circuit coupled to external computational means for provision of address and control signals to the sensor device, the interface circuit being operatively coupled the timing control logic, the pixel timing circuit, the row addressing circuit and the column addressing circuit.

20 Claims, 5 Drawing Sheets

INTEGRATED CMOS ACTIVE PIXEL DIGITAL CAMERA

FIELD OF THE INVENTION

The invention relates to CMOS based image sensors and more particularly to camera on a chip designs that are based on CMOS active pixel sensors.

BACKGROUND OF THE INVENTION

The are numerous prior art solid state imaging devices. Most common are Charge Coupled Device (CCD) based sensors. CCD sensors within the prior art lack very large scale integration (VLSI) that is employed in modern CMOS devices and in making the cameras that employ these CCD sensors require separate integrated circuits to provide timing, control and clock driver circuitry, therefore, resulting in larger and more expensive to produce cameras.

Additionally within the prior art are a number image sensing devices that have employed CMOS technology to make the solid state imagers. Among these prior art devices are teachings of integrating the analog to digital converter on the same chip as the image sensor. A CMOS image sensor of this type is described in a paper entitled "An Addressable 256×256 Photodiode Sensor Array With An 8-Bit Digital Output" in Analog Integrated Circuits and Signal Processing 4, pp. 37–49 (1993) by Janssen et al. Other prior art devices have integrated on chip timing generation such as those described by Nixon et al in a paper entitled "256×256 CMOS Active Pixel Sensor Camera-on-a-Chip", in 1996 IEEE International Solid-State Circuits Conference Digest of Papers, p. 178–179. However, larger scale integration is lacking within these prior art CMOS devices.

The prior art is also silent towards a coordinated design that allows for external digital interface that can control the image sensing device.

It should be apparent from the foregoing discussion that there remains a need within the art for a CMOS based imager that provides large scale integration sufficient to provide timing, control and clock circuitry and a digital interface that can control the solid state imaging device.

SUMMARY OF THE INVENTION

This invention addresses the aforementioned shortcomings within the prior art by providing an architecture of a digital camera-on-chip, built using an active pixel sensor (APS) employing Complementary Metal Oxide Semiconductor (CMOS) technology. The elements of the architectural design comprises functional blocks and their respective interconnections required to operate the APS, which in the preferred embodiment employs a Pinned Photo Diode as its photodetector element. Employing CMOS technology allows integration of timing, control, analog to digital conversion, and incorporation of a digital interface onto a single chip with the photodetecting element array.

The large scale integration taught by the present invention allows features such as electronic zoom and windowing capability. The features provided can be controlled by logic within a digital interface. A free running mode (default operational mode) provides a full resolution image that is independent of the windowing/zoom logic therefore, not requiring control signals from the digital interface. A Photometeric mode allows for selection of groups of pixels to determine the proper parameters such as exposure control. This exposure is effected by proper timing of the electronic shutter. A variety of sleep modes can provide power savings of varying degrees.

The architecture of this CMOS APS comprises of the following connected blocks x-y addressable pixel array timing generation and external interface control logic, programmable Analog to Digital Converter (ADC) and associated signal processing circuitry.

These and other features are provided by a CMOS based image sensor having

An image sensor device comprising:

a silicon substrate having a plurality of CMOS circuit formed thereon;

a pixel array having a plurality of rows and a plurality of columns formed within the substrate;

a timing control logic block formed within the substrate;

a row addressing circuit formed within the substrate and operatively connected to each pixel array and the timing control circuit, the row addressing circuit having a row bus that provides address lines to each row in the pixel array;

a column addressing circuit formed within the substrate;

a pixel timing circuit formed within the substrate;

a signal processing circuit contained within the substrate; and an interface circuit coupled to external computational means for provision of commands directing the sensor to generate address and control signals to the sensor device, the interface circuit being operatively coupled to the timing control logic, the pixel timing circuit, the row addressing circuit and the column addressing circuit.

For a better understanding of the present invention, together with other and further objects, advantages and capabilities thereof, reference is made to the following detailed description and appended claims in connection with the preceding drawings and description of some aspects of the invention.

DETAILED DESCRIPTION OF THE INVENTION

It has been discovered that a digital camera-on-chip can be built using an active pixel sensor (APS) employing Complementary Metal Oxide Semiconductor (CMOS) technology that integrates functions for timing, control, analog to digital conversion, and incorporation of a digital interface onto a single chip.

Figure 1:
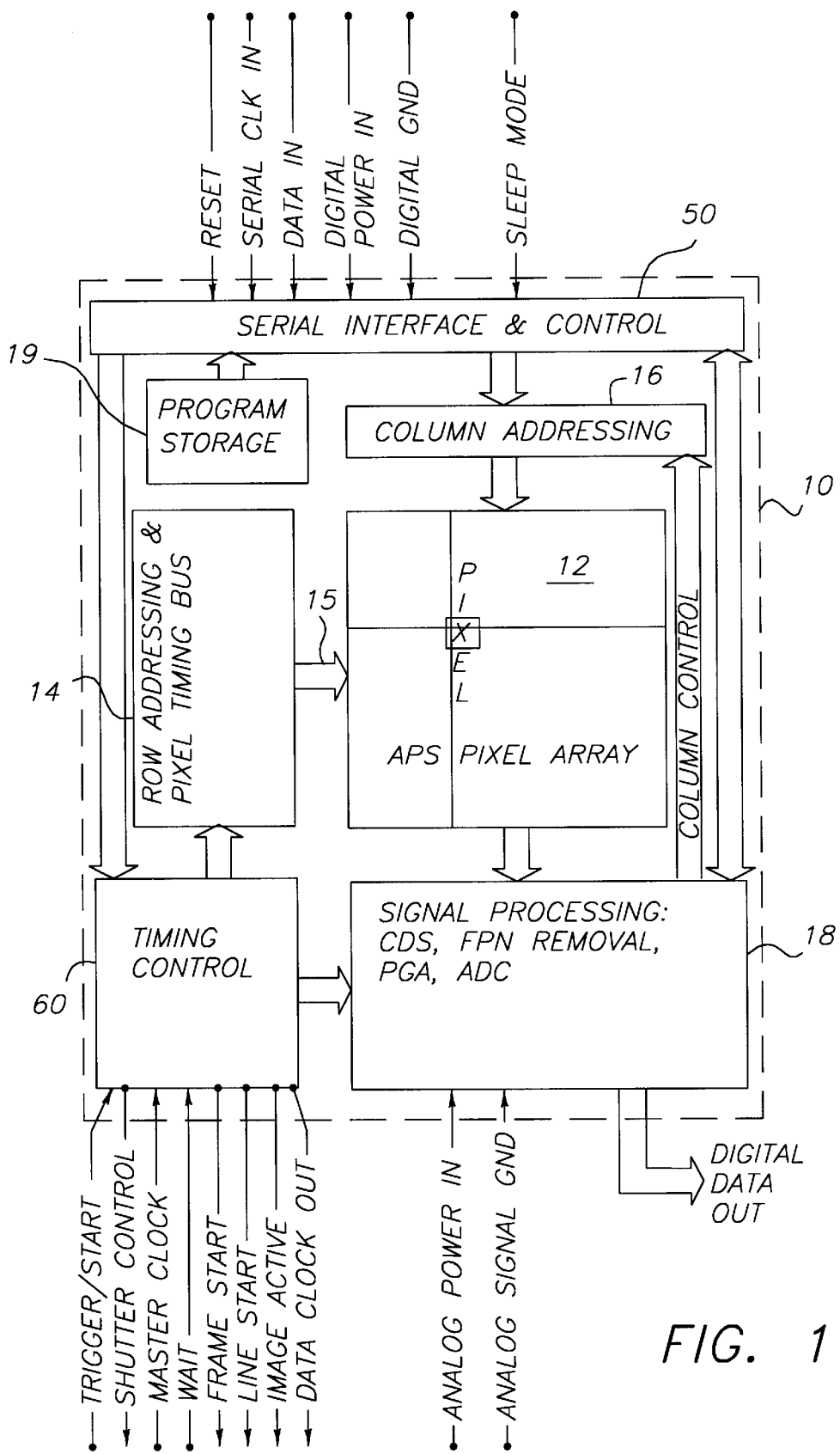
FIG. 1 is a functional block diagram of the integrated CMOS image sensor as envisioned by the present invention.

Referring to FIG. 1, the elements of the architectural design generally referred to as sensor 10, comprise functional blocks and their respective interconnections required to operate an the APS pixel array 12. Additionally, the architecture of sensor 10 provides timing, control, clock and analog to digital conversion on a single CMOS chip. The present invention as seen in FIG. 1 represents a block diagram that can be implemented by any of numerous design disciplines, such as hardware description language, or schematic entry. Preferably, the implementation would be in CMOS to provide reasonable power consumption. A silicon implementation can be created through a design specification that is then used to create either a microprogrammed based implementation or a state machine based implementation. The preferred embodiment is placed in silicon employing a state machine written in VHSIC Hardware Description Language (VHDL). VHDL is employed as a form of electronic design automation.

The pixel array 12, as seen in FIG. 1, is x-y addressable forming two-dimensional array 12 of pixels. Various resolutions of array 12 are possible, such as a standard VGA resolution of 640 by 480 pixels. Each pixel within the preferred embodiment typically comprises a photodetector (which in the preferred embodiment is a pinned photodiode), a transfer gate, a reset gate, a row-select gate and a source-follower amplifier.

The array 12 will convert incident light into photoelectrons which will reside within each photodetector in the array 12 as a stored charge version of the incident image focused upon the array 12 through a camera lens (not shown). Each pixel is selected for outputting the stored charge through row addressing 14 and column addressing 16 circuits that are integrated on sensor 10. The image is read out by having row select 14 provide the address for the selected row on row bus 15 which sets a common row bus to active state.

The serial interface and control 50 allows for external microcontroller, or other means of computer program, to provide settings for the camera-on-a-chip based on operator or other automated algorithm. Among these settings are operations of the camera chip in specific modes such as light-intensity (photometer) measurement for setting exposure conditions. There is also a default power-up mode of the imager chip which runs it at a predetermined manner before any programming is performed. For example, when power is first applied the chip would run in a full-resolution mode with an exposure timing consistent with room light condition. This default mode is designed appropriately for each application intended.

The serial interface and control logic 50 provides controls used in the generation of sequencing signals such as x-y addresses, reset, sample, transfer and other signals generated by the timing control logic 60. A set of commands from the serial interface and control logic 50 is loaded into the appropriate control registers within the timing and control logic 60 to enable different timing modes for integration and readout of the pixel array. The read-out of sensor 10 can be programmed at full resolution (all the pixels), an x-y windowed set of the pixels, or by subsampling (every other row) etc. The timing logic control 60 also provides control signals for the operation of the reading out of the sensor 10.

The present invention envisions that an Analog Digital Converter (ADC) may be included in the CMOS sensor 10. Also envisioned is providing an ADC external to sensor 10. This is simply a design choice that is made based on tradeoffs of the benefits and detriments of each of the designs. In either case it is important that the ADC be placed in conjunction with the pixel read-out to ensure the digital bit output are meaningful and artifacts are minimized.

The timing logic control 60 provides: (1) addresses to the row addressing and pixel timing bus 14 when every row is going to be readout in a full resolution mode; (2) addresses to the row addressing and pixel timing bus 14 when a subset of rows are going to be readout such as in every other or every fourth row as used in a subsampling mode that would typically be employed in video conferencing; and (3) the windowing capabilities needed for addressing the subregions of pixels. The timing and control logic 60 also controls electronic shuttering mode control including: (1) the resetting of pixels relative to the frame rate; (2) control of integration mode for each frame; (3) photometer mode which controls light sensitivity level and adjustment of electronic shuttering, this also includes the sensing of fluorescent light beat (i.e. 60 Hz) and responsive control of the electric shutter that satisfies the relation $ESS = n/2 * line_{13} rate$ seconds, where ESS is the electronic shutter speed and n is potentially any factor of the line rate, which in the preferred embodiment is 60 Hz.

Sensor 10 generally operates as follows: at a predetermined time, a transfer signal is applied to all the pixels in the row by a bus line within the common row bus to move the collected photoelectrons from each of the photodiodes within that row to a sensing node for each of the pixels. The sensing node for each of the pixels is connected to a source follower amplifier input, which is typical within the art of Active Pixel Sensors. The row bus also enables the reset signal to be applied to the pixels which connects the photodiode and/or the sensing node to a pre-set bias reset voltage.

A double correlated sampling scheme can also be employed to output the reset level of the sensing node by first resetting it and then read the source-follower output before transferring the photoelectrons. Another output sample is taken after the photoelectrons are transferred from the photodiode. The difference in the two sampled signals represent a true reading of the amount of photoelectrons being generated by the light incident on that pixel.

The column signal processing and ADC 18 allows the temporary storage in capacitors of the reset and signal levels of each pixel. These signals are then used by an ADC circuit to convert the difference of the signal levels to a digital representation. Depending on the speed of the particular ADC circuit employed, the digital values can be delivered outside the camera-on-a-chip at real time rates to update the image display or for motion capture by a frame storage. Optionally, a local on chip temporary digital storage could be used to buffer the data. This ADC circuit could be a single high-speed unit which can convert the number of pixels (total number of pixels times the frame rate) needed by the external device in real time. Alternatively, a per-column, or a per-n-column, slower ADC could be employed to convert all the analog pixel values in the rows in parallel.

Figure 2:
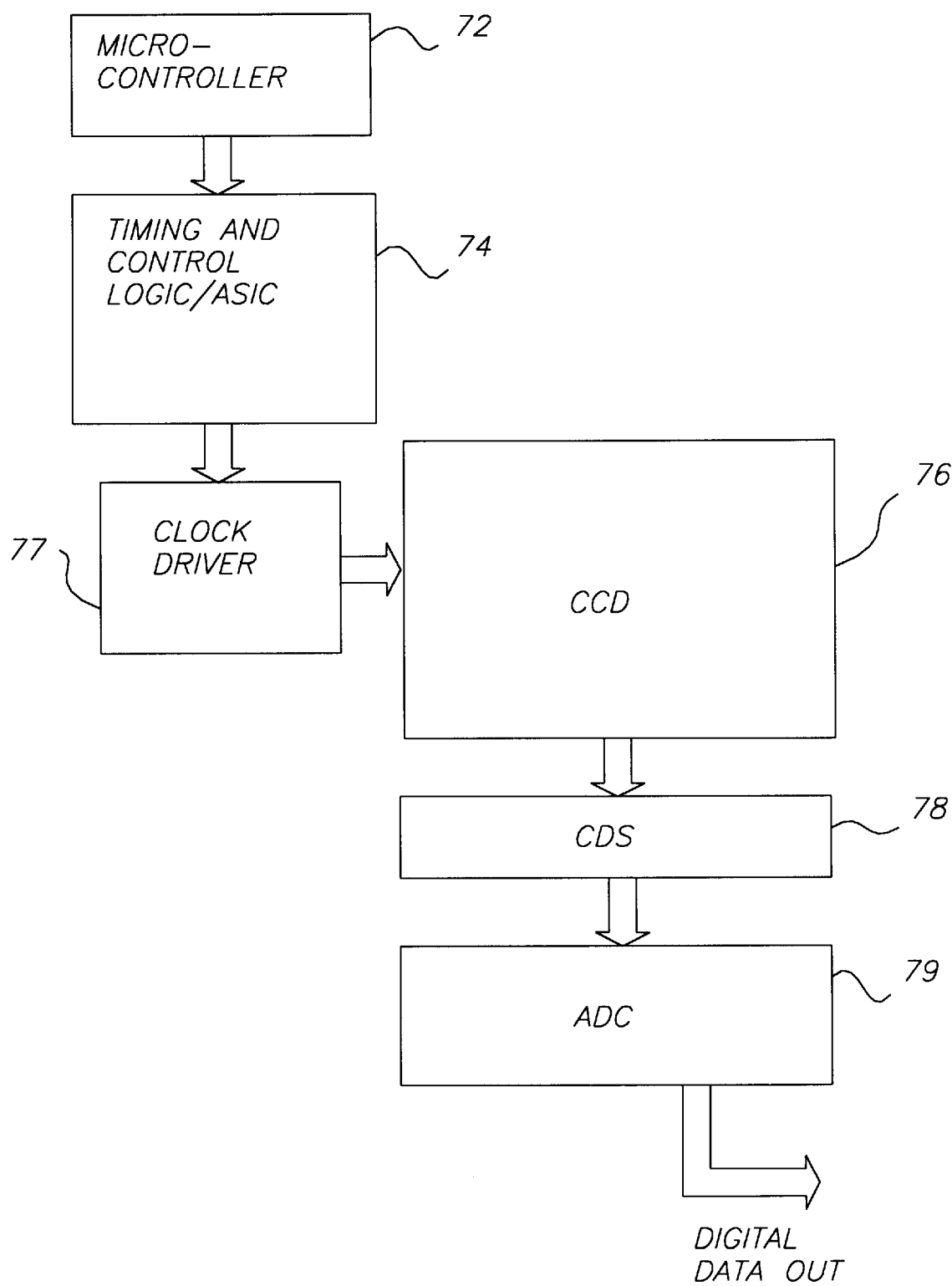
FIG. 2 is a functional block diagram of a prior art CCD camera.

FIG. 2 illustrates a typical prior art CCD based system 75 showing the various devices used to implement a digital camera. Microcontroller 72 provides the basic control signals for system 75. Timing and logic control 74, typically an ASIC device, will generate timing signals required by clock driver 77 which translates these signals into the appropriate levels necessary to control CCD 76. The Microcontroller 72 programs the proper sequence for the imaging mode being used. Correlated Double Sampling (CDS) 78 will generate the true value of the signal related to light impinging on CCD 76. The true value of the signal is then converted into a digital signal by analog to digital converter 79.

Figure 3:
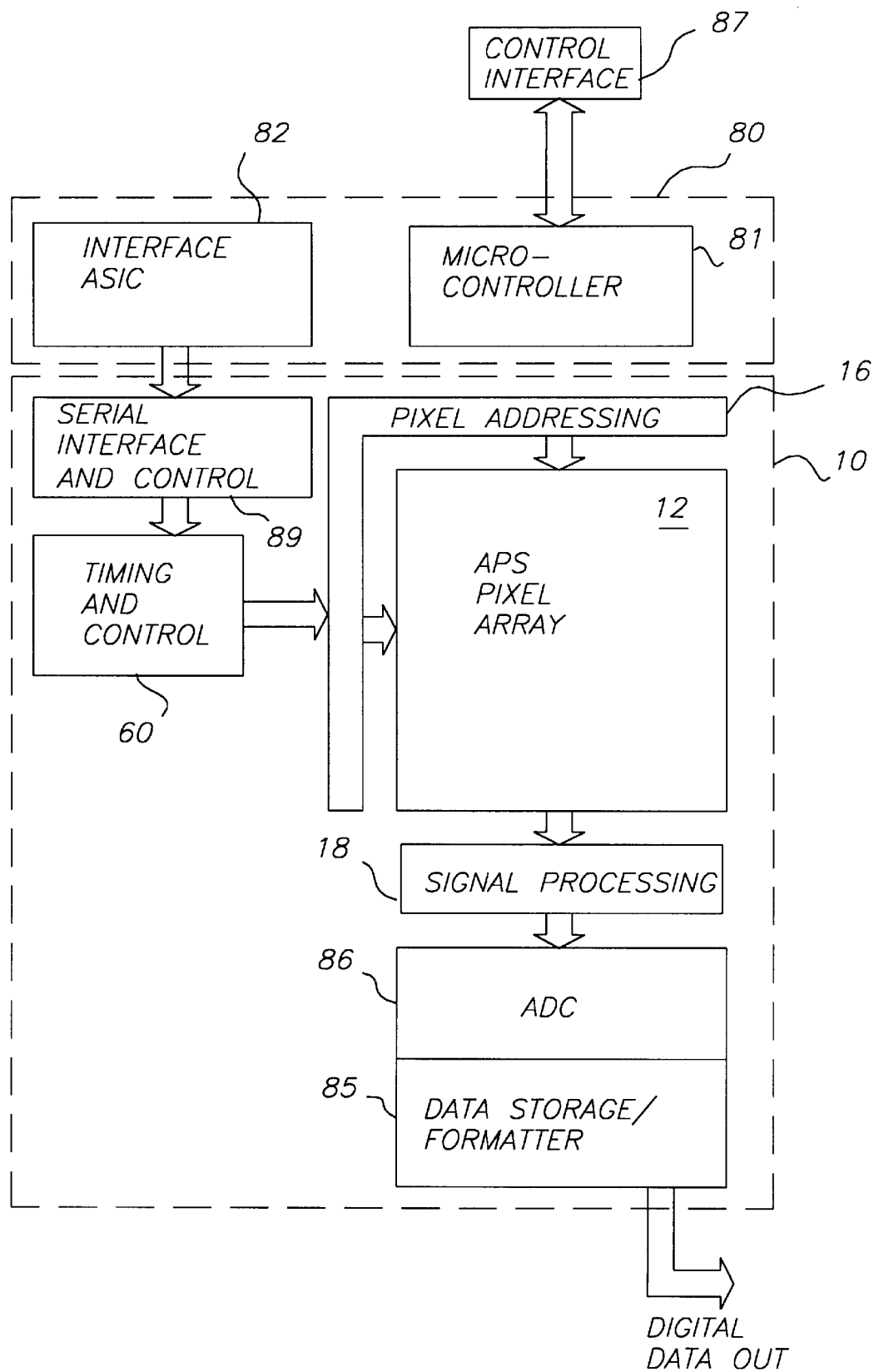
FIG. 3 is a block diagram of a camera employing the camera on a chip sensor as envisioned by the present invention having similar functionality to the diagram shown in FIG. 2

FIG. 3 illustrates the a system as envisioned by the present invention which has numerous advantages over the system shown in FIG. 2. Most of the functional blocks as seen in FIG. 2 are incorporated into a single silicon camera on-a-chip system 10 of FIG. 3 with the exception Microcontroller 81 and interface ASIC 82. It will be understood by those skilled in the art that Microcontroller 81 and ASIC 82 can be combined into a larger ASIC device 80 having embedded with a controller. ASIC 82 provides interface with serial interface and control logic 50 of the camera-on-chip system 10. Within the preferred embodiment, ASIC 82 provides digital processing of digital data that is output from the camera on-a-chip system 10. ASIC 82 provides faster data processing of image data because of the hardware oriented processing that is provided. ASIC 82 and controller 81 can also be formed as part of the camera-on-a chip system 10. A buffer memory 85 may be included to throttle the data from the (Analog to Digital Converter) ADC 86.

Figure 4:
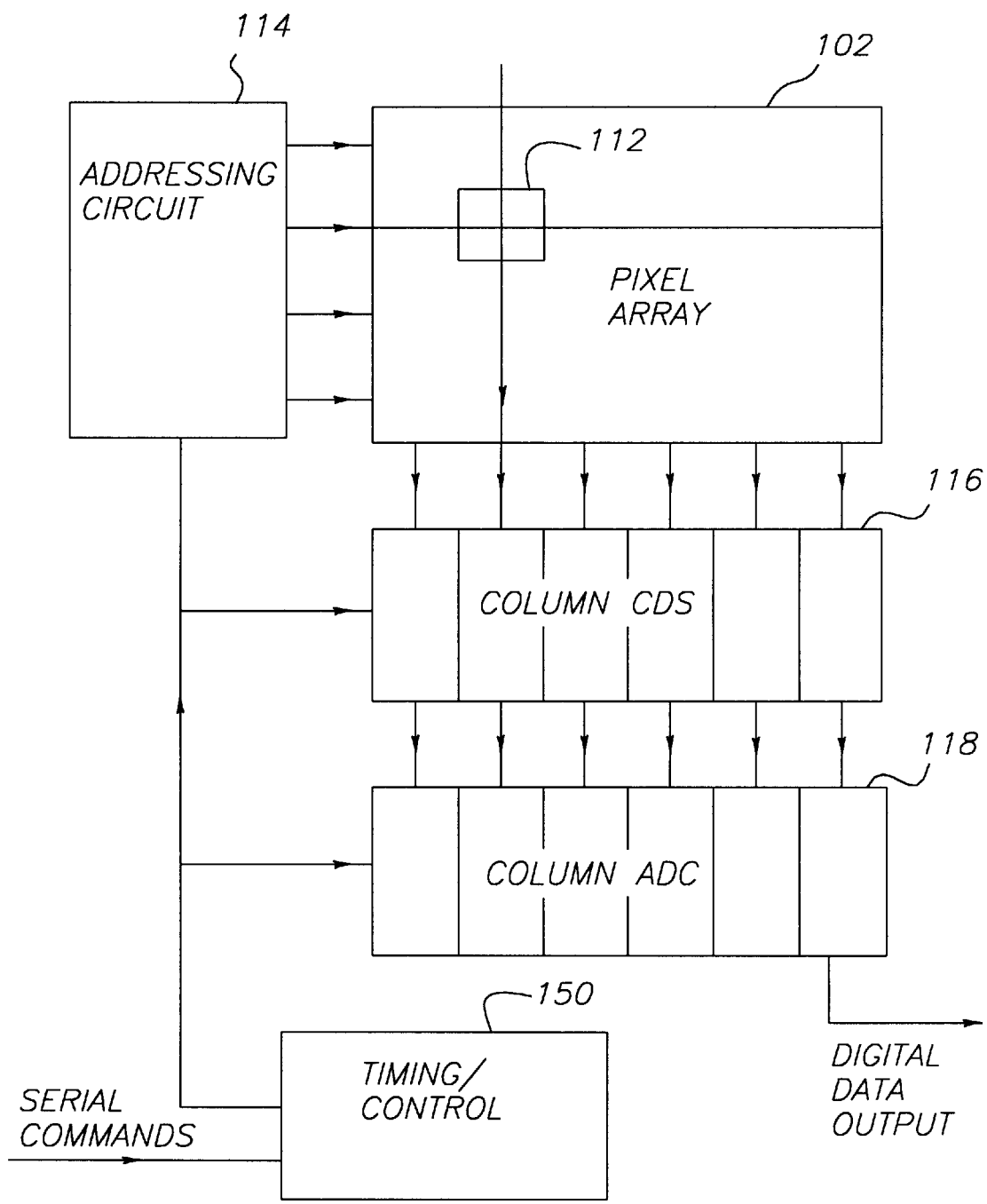
FIG. 4 is a block diagram of the present invention addressing and read out of pixels in the pixel array.

Referring now to FIG. 4, a simplified block diagram of an embodiment of the present invention illustrating a pixel array 102 is shown comprising a 4 row by six column array of pixels. The illustration in FIG. 4 is intentionally simplified, the preferred embodiment of the present invention is a 640 by 480 image sensing device. Referring to FIG. 4, addressing circuit 114 includes addressing circuits for both row and column selection. The following discussion will detail the decoding of row addresses which is a counter scheme (in the case of FIG. 4 only a 2 bit counter), the decoding of column addresses is accomplished in a similar manner but is incremented differently. The row addressing portion and provides operating as well as timing and control signals (such as transfer, reset enable and select) to the specific row being addressed. This addressing circuit can be built using logic gates such as NAND gates or it may be constructed as a shift register to sequentially address each row.

Control signals that are generated by the timing and control circuit 60 row and column addressing 114 as well as sequencing of the per column signal processing. The timing and control circuit 60 is programmed by the Microcontroller 81 as shown in FIG. 3 using commands that traverse the serial interface and control 50 (as seen in FIG. 3) via the communication port to interface with sensor chip 10. Upon being addressed, a row of pixels will strobe the photoelectrons stored therein into the correlated double sampling (CDS) 116 circuits which reduce the noise in the signal. FIG. 4 illustrates a per-column ADC circuit 118 that detects the signal that is readout of the pixel array via a Correlated Double Sampling (CDS) 116 circuit. The signal is then converted into a digital word by the per-column ADC 118. ADC 118 can perform this conversion either on a single column or on a set of the columns. The preferred embodiment employs 8 bit analog to digital conversion on a per basis for speed considerations. The ADC can be constructed using a successive approximation scheme that is well known in the art of ADC design. The per column (or per set of columns) arrangement allows the conversion of the pixel signals in parallel so that the conversion speed of the ADC is reduced to the line scan time.

The timing signals required by the CDS 116 and the ADC 118 circuits are generated by the Timing/Control unit 60. For example the per column CDS 116 performs a reset sample before the transfer gate activated with an entire row of pixels from the pixel array, this is followed by a signal sampling after transfer from the diode to the sensing node of each pixel.

Figure 5:
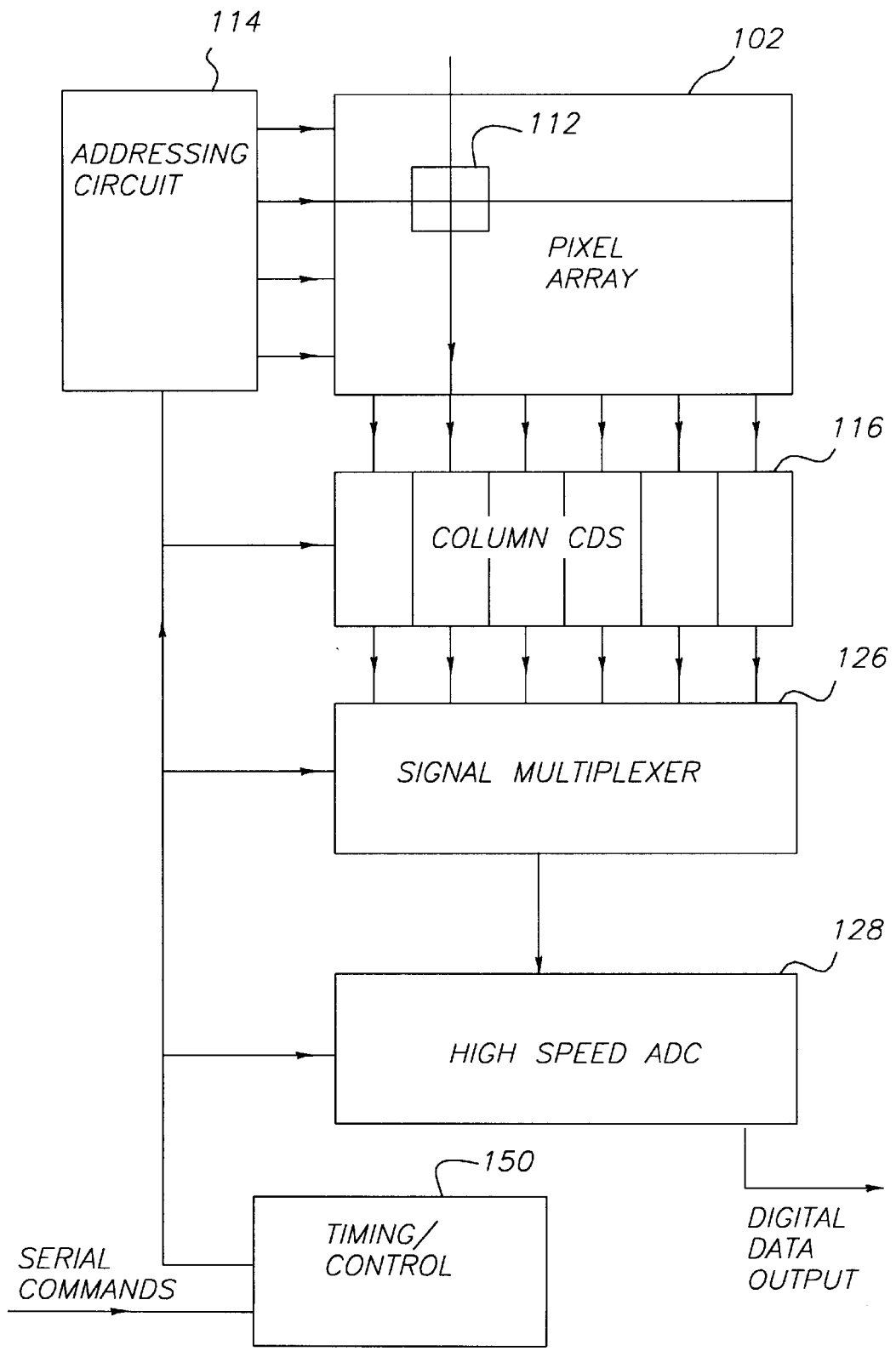
FIG. 5 is a diagram illustrating the addressing, multiplexing and delivering of pixels to an analog digital converter.

Referring now to FIG. 5, which is an illustration of an embodiment of the invention similar to that shown in FIG. 4 and identical circuits therefore, have the same reference indicators. In FIG. 5 however, the signals from each pixel of the addressed rows are supplied to signal multiplexer 126 where they are multiplexed and delivered to a single or multiple high speed ADC 128 for conversion to digital words. In the example shown in FIG. 5 the number of actual analog to digital converters used to implement high speed ADC 128 is small (such as for example either a single ADC or possibly multiple ADC's), the conversion rate is now the normal pixel data rate divided by the number of ADCs.

The large scale integration taught by the present invention allows features such as electronic zoom and windowing capability. The features provided can be controlled by logic within a digital interface. A free running mode (default operational mode) provides a full resolution image that is independent of the windowing/zoom logic therefor, not requiring control signals from the digital interface. A Photometeric mode allows for selection of groups of pixels to determine the proper parameters such as exposure control. A variety of sleeper modes can provide power savings of varying degrees.

The imager array can be made color-sensitive by adding a color filter array (CFA) mosaic patterned in a predetermined manner (such as with a Bayer checker board) to give color rendition of the scene being imaged.

The architecture implements a complete camera-on-chip. All the electronic control elements and signaling circuits are being integrated onto a single piece of silicon. This simplifies camera systems design in a way that the camera designer can concentrate on features (such as the human interface) rather than details of the timing required to capture an image with the chip.

The integrated chip also is lower power, an important consideration for portable application.

The invention has been described in detail with particular reference to certain preferred embodiments thereof, but it will be understood that variations and modifications can be effected within the spirit and scope of the invention.

Parts List 10 sensor
12 pixel array
14 row addressing and pixel timing function
15 row bus
16 column addressing
18 signal processing
50 serial interface
60 timing and control logic
72 Microcontroller
74 timing and control logic
75 prior art system
76 CCD
77 Clock driver
78 CDS
79 analog to digital converter
80 glue logic chip (ASIC)
81 microcontroller
85 buffer memory
102 pixel array
114 addressing circuit
116 per column CDS
118 per column ADC
126 signal multiplexer
128 high speed ADC

What is claimed is:

1. An image sensor device comprising:
    a silicon substrate having a plurality of CMOS circuit formed thereon;

a pixel array having a plurality of rows and a plurality of columns formed within the substrate;

a timing control logic block formed within the substrate;

a row addressing circuit formed within the substrate and operatively connected to each the pixel array and the timing control circuit, the row addressing circuit having a row bus that provides address lines to each row in the pixel array;

a column addressing circuit formed within the substrate;

a pixel timing circuit formed within the substrate;

a signal processing circuit contained within the substrate; wherein the pixel array, timing control logic block, row addressing circuit, column addressing circuit, pixel timing circuit, and signal processing circuit all are disposed on the substrate and can cooperatively operate to direct all imaging functions independent of external control; and a serial control interface circuit having bi-directional communication coupled to external computational means for provision of commands used by the sensor to generate address and control signals to the sensor device, the interface circuit being operatively coupled the timing control logic, the pixel timing circuit, the row addressing circuit and the column addressing circuit.

2. The invention of claim 1 wherein the timing control logic block further comprises an electronic shuttering control circuit.

3. The invention of claim 2 wherein the electronic shuttering control circuit further comprises a circuit that is programmable responsive to an input from the interface circuit.

4. The invention of claim 3 wherein the electronic shuttering control circuit is responsive to electronic shuttering mode data received from the interface circuit relating to one of the following: adjustment of electronic shuttering mode; clearing pixels relative to frame time; integration time for each frame; or fluorescent light beating.

5. The image sensor device of claim 1 further comprising a signal processing circuit coupled to the pixel array to receive data output from the array.

6. The image sensor device of claim 5 wherein the signal processing circuit further comprises a correlated double sampling circuit.

7. The image sensor device of claim 5 wherein the signal processing circuit further comprises a noise reduction circuit.

8. The image sensor device of claim 7 wherein the noise reduction circuit further comprises a fixed pattern noise removal circuit.

9. The image sensor device of claim 5 wherein the signal processing circuit is further comprises an analog to digital converter.

10. A semiconductor image sensing device comprising:

an imaging array containing a plurality of pixels formed on a semiconductor substrate;

a timing control block formed on the substrate programmable via a serial control communications interface having bi-directional communication formed on the substrate;

means for generating signal required to address and readout the pixel values formed on the substrate;

means for processing the pixel values to form digital words formed on the substrate; wherein the imaging array, timing control block, generating means and processing means all are disposed on the substrate and can cooperatively operate to direct imaging functions independent of external control; and means for delivering the digital words to external devices.

11. The device of claim 10 further comprising means for selecting a predetermined set of pixels from the imaging array contained within the timing control block.

12. The device of claim 10 further comprising means for performing electronic shuttering contained within the timing control block.

13. The device of claim 10 further comprising means for selecting a subset of pixels for exposure determination within the timing control block.

14. The device of claim 10 further comprising means for power conservation contained within the timing control block.

15. The device of claim 10 wherein the timing control block further comprises means for providing a signal which is delivered external to the device for synchronizing with a mechanical shutter.

16. The device of claim 10 wherein the timing control block further comprises means for providing a signal which is delivered external to the device for synchronizing with a strobe light.

17. The device of claim 10 further comprising a Microcontroller embedded within the sensor device, the Microcontroller further comprising interface means for user input.

18. The device of claim 17 further comprising an ASIC designed for interfacing the Microcontroller to the remaining portions of the sensor device.

19. The device of claim 10 further comprising an embedded memory associated with the ADC output.

20. The device of claim 19 wherein the embedded memory further comprises a data buffering mechanism which allows different speeds of reads and writes to the mechanism.

* * * * *